(12) United States Patent
Kargl et al.

(10) Patent No.: US 8,792,846 B2
(45) Date of Patent: Jul. 29, 2014

(54) DEMODULATOR AND METHOD FOR DEMODULATING A MODULATED CARRIER SIGNAL

(75) Inventors: Walter Kargl, Graz (AT); Edmund Ehrlich, Grambach (AT)

(73) Assignees: Infineon Technologies AG, Neubiberg (DE); Technische Universitaet Graz, Graz (AT)

( * ) Notice: Subject to any disclaimer, the term of this patent is extended or adjusted under 35 U.S.C. 154(b) by 880 days.

(21) Appl. No.: 12/755,094

(22) Filed: Apr. 6, 2010

(65) Prior Publication Data

US 2011/0244811 A1   Oct. 6, 2011

(51) Int. Cl.
  *H04B 1/18*   (2006.01)
  *H04L 27/233*   (2006.01)
  *H04L 25/06*   (2006.01)

(52) U.S. Cl.
  CPC .......... *H04L 25/068* (2013.01); *H04L 27/2338* (2013.01)
  USPC .............. 455/293; 455/76; 455/77; 375/355; 329/361

(58) Field of Classification Search
  USPC ................. 329/361, 347, 348, 363, 304, 306; 455/73, 130, 293, 76, 77; 375/324, 355
  See application file for complete search history.

(56) References Cited

U.S. PATENT DOCUMENTS

| | | | |
|---|---|---|---|
| 3,518,547 A * | 6/1970 | Filipowsky | 375/145 |
| 4,301,455 A * | 11/1981 | Yetter | 342/398 |
| 4,652,775 A | 3/1987 | Daudelin | |
| 5,937,013 A | 8/1999 | Lam et al. | |
| 6,407,629 B1 | 6/2002 | Burri et al. | |
| 6,415,004 B1 * | 7/2002 | Fujimura et al. | 375/324 |
| 6,535,553 B1 * | 3/2003 | Limberg et al. | 375/232 |
| 6,650,264 B1 | 11/2003 | Chan et al. | |
| 6,677,892 B1 * | 1/2004 | Elleaume | 342/194 |
| 6,961,370 B2 * | 11/2005 | Chappell | 375/224 |
| 7,039,128 B2 * | 5/2006 | Vaananen | 375/316 |
| 7,317,775 B1 * | 1/2008 | Erhart et al. | 375/355 |
| 7,480,348 B2 | 1/2009 | Nakano | |
| 8,335,289 B2 * | 12/2012 | Park et al. | 375/354 |
| 2004/0203478 A1 | 10/2004 | Scott | |
| 2005/0096881 A1 * | 5/2005 | Watson et al. | 702/190 |

(Continued)

FOREIGN PATENT DOCUMENTS

| | | |
|---|---|---|
| DE | 69930745 T2 | 9/2006 |
| EP | 0289237 A2 | 11/1988 |

(Continued)

OTHER PUBLICATIONS

Co-pending U.S. Appl. No. 12/753,450, filed Apr. 1, 2010, entitled "Demodulator and Method for Demodulating a Carrier Signal."

*Primary Examiner* — Lewis West
*Assistant Examiner* — Richard Chan
(74) *Attorney, Agent, or Firm* — Murphy, Bilak & Homiller, PLLC

(57) ABSTRACT

A demodulator includes a sampler configured to sample a plurality of first amplitude values of a modulated carrier signal using a constant sampling frequency and a plurality of second amplitude values of the modulated carrier signal at different times using the same constant sampling frequency. The constant sampling frequency is equal to a carrier frequency of the modulated carrier signal with a tolerance of +/−1% of the carrier frequency.

19 Claims, 6 Drawing Sheets

(56) References Cited

U.S. PATENT DOCUMENTS

| | | |
|---|---|---|
| 2006/0160515 A1 | 7/2006 | Wong |
| 2006/0274857 A1 | 12/2006 | Chiu |
| 2006/0274862 A1* | 12/2006 | Lui et al. ............... 375/341 |
| 2006/0274874 A1 | 12/2006 | Kumar et al. |
| 2007/0118312 A1* | 5/2007 | Cech et al. ............... 702/65 |
| 2007/0140382 A1* | 6/2007 | Qian ............... 375/332 |
| 2007/0233407 A2* | 10/2007 | Cech et al. ............... 702/65 |
| 2007/0291884 A1 | 12/2007 | Frederick et al. |
| 2008/0240319 A1 | 10/2008 | Ran |
| 2009/0028279 A1 | 1/2009 | Kitta |
| 2009/0103654 A1 | 4/2009 | van Waasen et al. |
| 2010/0167644 A1 | 7/2010 | Winter et al. |
| 2012/0008723 A1* | 1/2012 | Stojanovic ............... 375/355 |

FOREIGN PATENT DOCUMENTS

| | | |
|---|---|---|
| EP | 1482672 A1 | 12/2004 |
| GB | 2100538 A | 12/1982 |
| WO | 03/049275 A1 | 6/2003 |
| WO | 2006/105565 A1 | 10/2006 |
| WO | 2007/001863 A2 | 1/2007 |
| WO | 2008093254 A1 | 8/2008 |

* cited by examiner ns**DEMODULATOR AND METHOD FOR DEMODULATING A MODULATED CARRIER SIGNAL

BACKGROUND

To communicate with other devices in a wireless communication system, many wireless devices include demodulators. These demodulators are, for example, included in chip sets that enable wireless communication via one of several communication standards, such as Bluetooth, digital enhanced cordless telecommunication (DECT), radio frequency identification (RFID) communication or others. Since these chip sets are commonly used in cell phones, music players, proximity coupling devices (PCD) or proximity integrated circuit cards (PICC), it is desirable for the chip sets to be relatively compact and efficient, thereby providing low cost and high data rates.

SUMMARY

According to an embodiment of a demodulator, the demodulator includes a sampler configured to sample a plurality of first amplitude values of a modulated carrier signal using a constant sampling frequency and a plurality of second amplitude values of the modulated carrier signal at different times using the same constant sampling frequency. A time a first amplitude value of the plurality of first amplitude values is determined and a time a temporal directly following a second amplitude value of the plurality of second amplitude values is determined comprises a time difference so that for each pair of first and second amplitude values at least an absolute value of the first amplitude value or an absolute value of the temporal directly following the second amplitude value is equal to or larger than 50% of a maximal absolute value of an amplitude of the modulated carrier signal between the first amplitude value and a temporal directly following the first amplitude value or between the first amplitude value and a temporal directly preceding the first amplitude value.

According to another embodiment of a demodulator, the demodulator includes a sampler configured to sample a plurality of first amplitude values of a modulated carrier signal using a constant sampling frequency and a plurality of second amplitude values of the modulated carrier signal at different times using the same constant sampling frequency. The constant sampling frequency is equal to a carrier frequency of the modulated carrier signal with a tolerance of +/−1% of the carrier frequency.

According to yet another embodiment of a demodulator, the demodulator includes a means for sampling a modulated carrier signal configured to sample a plurality of first amplitude values of a modulated carrier signal using a constant sampling frequency and a plurality of second amplitude values of the modulated carrier signal at different times using the same constant sampling frequency. The time a first amplitude value of the plurality of first amplitude values is determined and the time a temporal directly following a second amplitude value of the plurality of second amplitude values is determined comprises a time difference so that for each pair of first and second amplitude values, at least an absolute value of the first amplitude value or an absolute value of the temporal directly following the second amplitude value is equal to or larger than 50% of a maximal absolute value of an amplitude of the modulated carrier signal between the first amplitude value and a temporal directly following the first amplitude value or between the first amplitude value and a temporal directly preceding the first amplitude value.

According to an embodiment of a transceiver, the transceiver includes a demodulator comprising a sampler configured to sample a plurality of first amplitude values of a modulated carrier signal using a constant sampling frequency and a plurality of second amplitude values of the modulated carrier signal at different times using the same constant sampling frequency. A time a first amplitude value of the plurality of first amplitude values is determined and a time a temporal directly following a second amplitude value of the plurality of second amplitude values is determined comprises a time difference so that for each pair of first and second amplitude values at least an absolute value of the first amplitude value or an absolute value of the temporal directly following the second amplitude value is equal to or larger than 50% of a maximal absolute value of an amplitude of the modulated carrier signal between the first amplitude value and a temporal directly following the first amplitude value or between the first amplitude value and a temporal directly preceding the first amplitude value. The transceiver further includes an oscillator unit configured to provide an oscillator signal comprising a carrier frequency. The transceiver is configured to transmit a signal with the carrier frequency and to receive the modulated carrier signal. The constant sampling frequency is equal to the carrier frequency of the oscillator signal with a tolerance of +/−1% of the carrier frequency.

According to an embodiment of a method for demodulating a modulated carrier signal, the method includes sampling a plurality of first amplitude values of the modulated carrier signal using a constant sampling frequency and sampling a plurality of second amplitude values of the modulated carrier signal at different times using the same constant sampling frequency. A time a first amplitude value of the plurality of first amplitude values is determined and a time a temporal directly following a second amplitude value of the plurality of second amplitude values is determined comprises a time difference so that for each pair of first and second amplitude values, at least an absolute value of the first amplitude value or an absolute value of the temporal directly following the second amplitude value is equal to or larger than 50% of a maximal absolute value of an amplitude of the modulated carrier signal between the first amplitude value and a temporal directly following the first amplitude value or between the first amplitude value and a temporal directly preceding the first amplitude value.

According to another embodiment of a method for demodulating a modulated carrier signal, the method includes sampling a plurality of first amplitude values of a modulated carrier signal using a constant sampling frequency and sampling a plurality of second amplitude values of the modulated carrier signal at different times using the same constant sampling frequency. The constant sampling frequency is equal to a carrier frequency of the modulated carrier signal with a tolerance of +/−1% of the carrier frequency.

According to an embodiment of a computer program product comprising a computer readable medium storing program code for performing a method of demodulating a modulated carrier signal, when the computer program product runs on a computer or a microcontroller, the method includes sampling a plurality of first amplitude values of a modulated carrier signal using a constant sampling frequency. The method further includes sampling a plurality of second amplitude values of the modulated carrier signal at different times using the same constant sampling frequency. The constant sampling frequency is equal to a carrier frequency of the modulated carrier signal with a tolerance of +/−1% of the carrier frequency.

Those skilled in the art will recognize additional features and advantages upon reading the following detailed description, and upon viewing the accompanying drawings.

BRIEF DESCRIPTION OF THE DRAWINGS

Embodiments according to the invention will be explained in greater detail in the following with reference to the accompanying Figures, in which.

DETAILED DESCRIPTION

Figure 1A:
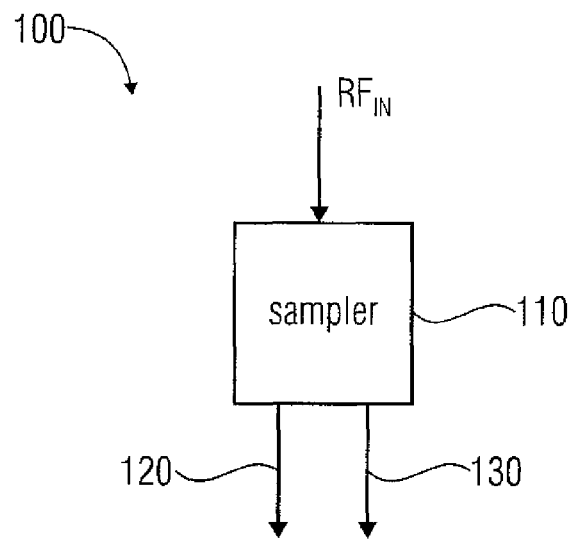
FIG. 1a is a block diagram of an embodiment of a demodulator.

In the following, the same reference numerals are partly used for objects and functional units having the same or similar functional properties and the description thereof with regard to a figure shall apply also to other figures in order to reduce redundancy in the description of the embodiments.

FIG. 1a shows a block diagram of a demodulator 100 according to an embodiment of the invention. The demodulator 100 comprises a sampler 110. The sampler 110 samples a plurality of first amplitude values 120 of a modulated carrier signal $RF_{IN}$ using a constant sampling frequency $f_c$ and a plurality of second amplitude values 130 of the modulated carrier signal $RF_{IN}$ at different times using the same constant sampling frequency $f_c$. The sampler 110 samples the amplitude values in a way that a time a first amplitude value 122 of the plurality of first amplitude values 120 is determined and a time a temporal directly following second amplitude value 132 of the plurality of second amplitude values 130 is determined, comprises a time difference Δt so that for each pair of first and second amplitude values 122, 132, at least an absolute value of the first amplitude value 122 or an absolute value of the temporal directly following second amplitude value 132 is equal to or larger than 50% of a maximal absolute value of an amplitude of the modulated carrier signal between the first amplitude value 122 and a temporal directly following first amplitude value 124 or between the first amplitude value 122 and a temporal directly preceding first amplitude value 126.

Figure 1B:
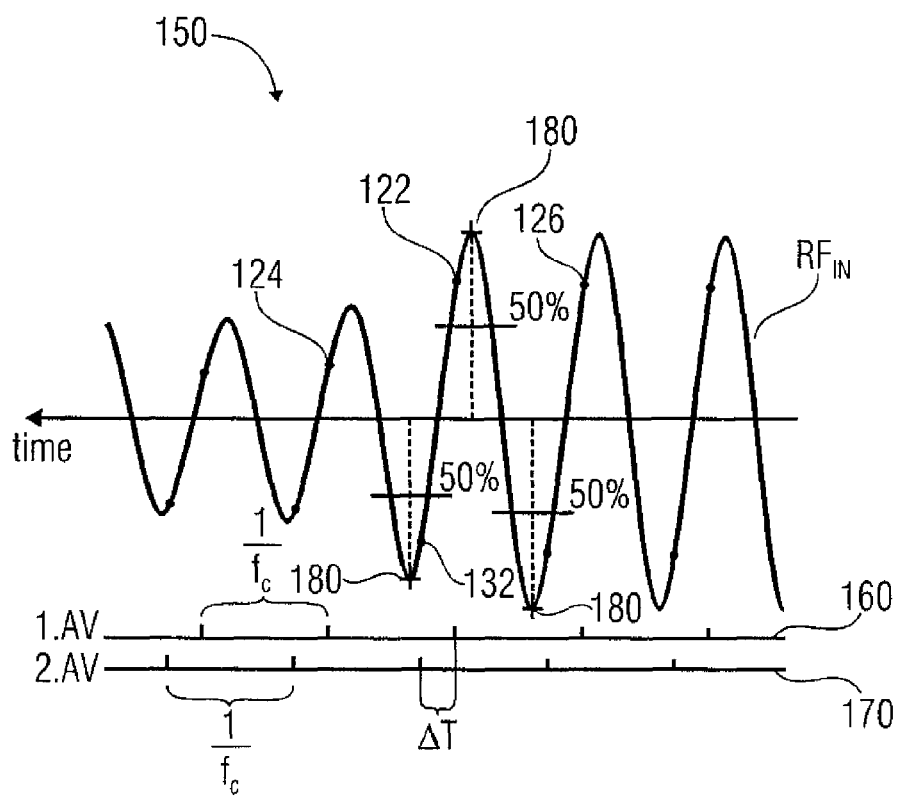
FIG. 1b is a schematic illustration of a modulated carrier signal with marked sampled amplitude values.

Fittingly, FIG. 1b shows a schematic illustration 150 of an example of a modulated carrier signal $RF_{IN}$ with marked sampled amplitude values.

If a signal is sampled with a constant sampling frequency $f_c$, it may be possible that the signal is sampled at points where the amplitude of the signal is very low or near zero. Therefore, according to the inventive concept, the modulated signal is sampled twice with the same constant sampling frequency, but with a time difference Δt between pairs of first and second amplitude values. In this connection, a pair of first and second amplitude values is a first amplitude value and the temporal directly following second amplitude value or vice versa. By choosing an appropriate time difference Δt, it may be guaranteed that at least an absolute value of the first amplitude value 122 or an absolute value of the temporal directly following second amplitude value 132 of each pair of first and second amplitude values comprises a sufficiently high amplitude value for further processing. In this way, it may be possible to provide continuously sampled amplitude values with a sufficiently signal quality. Further, an under-sampling of the modulated carrier signal $RF_{IN}$ (sampling with a constant sampling frequency lower than twice a carrier frequency $f_c$ of the modulated carrier signal $RF_{IN}$) may be possible without losing information, because the time difference Δt can be chosen so that the plurality of the first amplitude values 120 or the plurality of the second amplitude values 130 may provide a sufficient signal quality. Additionally, an analog mixer often used in known demodulators is not necessary, since the sampler 110 is able to sample the modulated carrier signal $RF_{IN}$ directly. Therefore, the demands on the sampler 110 may be reduced, since it is possible to sample with a relatively low sampling frequency, in comparison to known demodulators. Thus, the costs of the demodulator may be reduced.

Further, a demodulator 100 according to the described concept may handle very high bit rates of the signal modulated onto the carrier signal. It may be possible for the demodulator 100 to process signals with bit rates reaching up to the constant sampling frequency $f_c$.

Below the schematic modulated carrier signal $RF_{IN}$, FIG. 1b shows the sampling times 160 for the first amplitude values 120 and the sampling times 170 for the second amplitude values 130 indicating the constant sampling frequency $f_c$ and the time difference Δt between the sampling times 160 of the first amplitude values 120 and the sampling times 170 of the second amplitude values 130. Correspondingly, the sampled first and second amplitude values are marked on the modulated carrier signal by a dot. For one pair of a first amplitude value 122 and the temporal directly following second amplitude value 132, the temporal directly following first amplitude value 124 and the temporal directly preceding first amplitude value 126 as well as the maximum amplitude 180 of the modulated carrier signal $RF_{IN}$ are indicated. In this connection, a possible DC offset (direct current offset) of the modulated carrier signal $RF_{IN}$ is neglected. Further, since the maximal amplitude of the modulated carrier signal $RF_{IN}$ may vary due to the modulation, the absolute values are compared and the 50% requirement belongs to the amplitude maxima in the direct vicinity of the observed pair of amplitude values.

The sampler 110 may provide the plurality of first amplitude values 120 as a first sampling signal and the plurality of second amplitude values 130 as a second sampling signal.

The sampler 110 may be an independent hardware unit or part of a computer, a micro-controller or a digital signal processor or a computer program or software product configured to run on a computer, digital signal processor or a microcontroller.

The modulated carrier signal $RF_{IN}$ may be modulated, for example, by load modulation, IQ modulation (in-phase/quadrature phase modulation) or another modulation technique. For example, for load modulation, the modulator 100 easily distinguishes between two (or more) states of the load modulation. For IQ modulated signals, the demodulator 100 may easily distinguish between different amplitudes. For example, for a 16 QAM (quadrature amplitude modulation) constellation with an 8-bit constellation arranged on an inner circle and an 8-bit constellation on an outer circle, the demodulator 100 may easily distinguish between these two amplitude values.

In some embodiments, the constant sampling frequency may be chosen so that the time difference can be chosen according to the described concept.

In some embodiments of the invention, the constant sampling frequency $f_c$ is equal to a carrier frequency of the modulated carrier signal $RF_{IN}$ with a tolerance of +/−1% (or +/−10%, +/−5%, +/−0.1%) of the carrier frequency. In other words, the demodulator 100 may be built so that the constant sampling frequency is adapted to the carrier frequency of the modulated carrier signal $RF_{IN}$. Alternatively, the constant sampling frequency may also be half, twice or another integer multiple of the carrier frequency of the modulated carrier signal $RF_{IN}$.

In this case, the constant sampling frequency may change, if the carrier frequency of the modulated carrier signal $RF_{IN}$ changes.

Using the described concept, an under-sampling of the modulated carrier signal $RF_{IN}$ may be sufficient to demodulate the modulated carrier signal $RF_{IN}$, since the modulation of the carrier signal varies lower (with a frequency lower than half of the frequency of the carrier signal) than the carrier signal.

In some further embodiments according to the invention, the time difference $\Delta t$ is equal to a quarter of the period of oscillation of the modulated carrier signal $RF_{IN}$ with a tolerance of +/−1% (or +/ 10%, +/−5% or +/ 0.1%) of the period of oscillation. In other words, the sampling times of the second amplitude values 130 are shifted by 90° (+/−tolerance) compared with the sampling times of the first amplitude values 120. Therefore, if the first amplitude value of a pair of first and second amplitude values is zero or nearly zero, the second amplitude value is sampled at a maximum of the carrier signal and vice versa. Alternatively, the sampling times of the first amplitude values and the sampling times of the second amplitude values may be shifted by 70°, 80°, 85°, 95°, 90° or 100° or between 50° and 150°.

Some embodiments according to the invention relate to a sampler 110 comprising a first and a second analog-digital-converter (ADC). The first ADC is triggered by a sampling signal comprising the constant sampling frequency $f_c$ and the second ADC is triggered by the sampling signal delayed by the time difference $\Delta t$. The first ADC samples and provides the plurality of first amplitude values 120 and the second ADC samples and provides the plurality of second amplitude values 130. The delay $\Delta t$ of the sampling signal triggering the second ADC may be realized by a phase shifter or another delay element. In this example, it is sufficient to use ADCs being not faster than the constant sampling frequency $f_c$. For example, as mentioned above, the constant sampling frequency $f_c$ may be equal to the carrier frequency of the modulated carrier signal $RF_{IN}$. In this case, the requirements on the ADCs regarding the sampling frequency are very relaxed due to the under-sampling.

Alternatively, according to another embodiment of the invention, the sampler 110 comprises an ADC and a 1-to-4 multiplexer. In this example, the ADC is triggered by a sampling signal comprising a frequency equal to four times the constant sampling frequency $f_c$ to obtain and provide a plurality of amplitude values of the modulated carrier signal $RF_{IN}$ to the 1-to-4 multiplexer. The 1-to-4 multiplexer selects every fourth (4.) amplitude value of the plurality of amplitude values provided by the ADC to obtain and provide the plurality of the first amplitude values 120 and selects every fourth plus one (4.+1) amplitude value of the plurality of amplitude values provided by the ADC to obtain and provide the plurality of second amplitude values 130. In this way, the modulated carrier signal is also sampled twice using the constant sampling frequency $f_c$ with a time difference $\Delta t$ of a pair of first and second amplitude values corresponding to a 90° shift with reference to the constant sampling frequency $f_c$.

Additionally, the sampler 110 may comprise a 2-bit counter triggered by the sampling signal. This 2-bit counter or 2-bit adder may control the 1-to-4 multiplexer so that every fourth amplitude value outputted by the ADC is selected by the multiplexer for the plurality of first amplitude values 120 and every fourth plus one amplitude value is selected for the plurality of second amplitude values 130.

Some embodiments according to the invention comprise a down-sampler. The down-sampler may obtain and provide a first down-sampled digital signal with a predefined bit rate based on the plurality of first amplitude values 120 by selecting first amplitude values from the plurality of first amplitude values 120 with a down-sampling frequency according to the predefined bit rate. Further, the down-sampler may obtain and provide a second down-sampled digital signal with the predefined bit rate from the plurality of second amplitude values 130 by selecting second amplitude values of the plurality of second amplitude values 130 with the same down-sampling frequency. In other words, the down-sampler may reduce the amount of data provided by the sampler 110 according to a predefined bit rate. The predefined bit rate may relate to, for example, a bit rate of the signal modulated onto the carrier signal or a maximal bit rate of a signal modulated onto the carrier signal.

For example, the modulated carrier signal may comprise a carrier frequency of 13.56 MHz often used by RFID applications. Then, for example, the constant sampling frequency may also be 13.56 MHz so that the sampler outputs first amplitude values with a rate of 13.56 MHz and second amplitude values, also with a rate of 13.56 MHz. However, the data modulated onto the carrier signal may only comprise a low bit rate, for example, 848 kbit/sec. Therefore, it would be sufficient for the down-sampler to select first and second amplitude values with 848 kbit/sec. Alternatively, the amplitude values may be selected with twice the bit rate or a higher bit rate, for example, for reducing errors. Nevertheless, the amount of sampling data may be reduced by the down-sampler. In other words, the predefined bit rate may be equal to a bit rate of a modulation of the modulated carrier signal or an integer multiple of the modulation of the modulated carrier signal.

Additionally, the demodulator 100 may comprise a second down-sampler, the second down-sampler may obtain and provide a third down-sampled signal with the predefined bit rate based on the plurality of first amplitude values 120 by selecting first amplitude values different from the first amplitude values selected by the first down-sampler, which may be done with the same down-sampling frequency. Further, the second down-sampler may obtain and provide a fourth down-sampled signal with the predefined bit rate based on the plurality of second amplitude 130 values by selecting second amplitude values different from the second amplitude values selected by the first down-sampler. This may also be done with the same down-sampling frequency. In other words, the first and second down-samplers may select amplitude values so that a time a first amplitude value is selected by the first down-sampler and a time a first amplitude value is selected by the second down-sampler comprises a down-sampling time difference, and so that a time a second amplitude value is selected by the first down-sampler and a time a second amplitude value is selected by the second down-sampler comprises the same down-sampling time difference. The down-sampling time difference may depend on the predefined bit rate.

A down-sampler may be an independent hardware unit or part of a computer, a digital signal processor or a micro-controller or a computer program or software product configured to run on a computer, digital signal processor or a micro-controller.

Some embodiments according to the invention relate to a demodulator comprising a digital signal processor or a signal processing means. The digital signal processor may obtain and provide a digital bitstream based on the plurality of first amplitude values 120 and the plurality of second amplitude values 130 provided by a sampler described above. Alternatively, the digital signal processor may obtain and provide the digital bitstream based on the first down-sampled digital signal and the second down-sampled digital signal of a first down-sampler or based on the third down-sampled digital signal and the fourth down-sampled digital signal of a second down-sampler, if the demodulator comprises one or two down-samplers as described above.

The digital signal processor may perform an encoding and/or error correction of the data provided by the sampler or the down-samplers to obtain the digital bitstream representing the information contained by the signal modulated onto the carrier signal.

The digital signal processor may be an independent hardware unit or a part of a computer or micro-controller or a software product or computer program configured to run on a computer or micro-controller.

Figure 2:
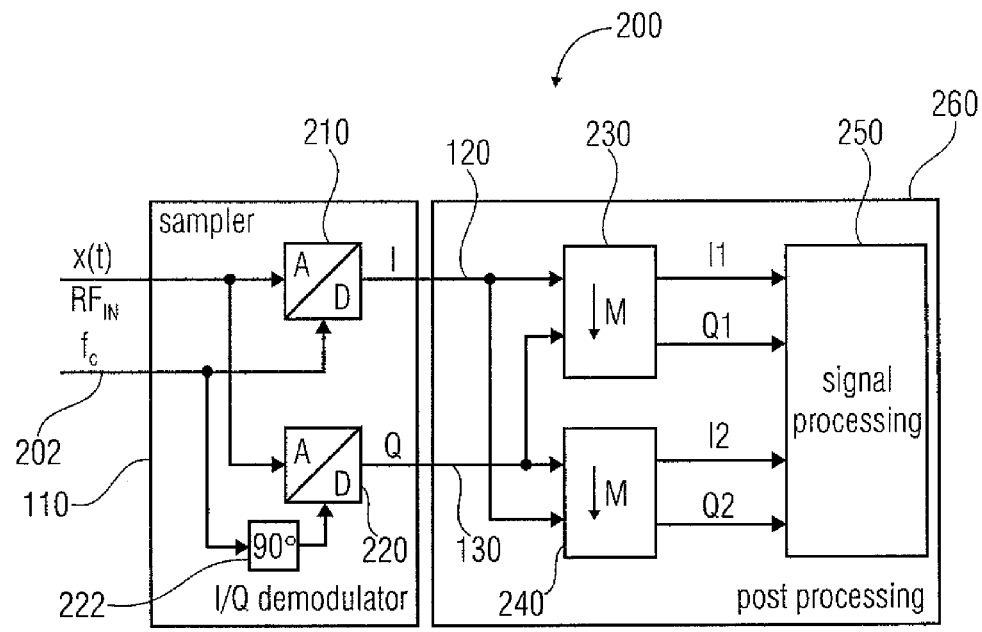
FIG. 2 is a block diagram of another embodiment of a demodulator.

FIG. 2 shows a block diagram of a demodulator 200 according to another embodiment of the invention. The demodulator 200 comprises a sampler 110 and a post-processing unit 260. The sampler 110 comprises a first analog-to-digital converter 210 (ADC), a second ADC 220 and a phase shifter 222. Both ADCs comprise an input for the modulated carrier signal $RF_{IN}$ (or x(t)). Further, a sampling signal 202 with a constant sampling frequency $f_c$ is provided to a second input of the first ADC 210 and the first ADC 210 comprises an output for providing the plurality of first amplitude values 120. The second ADC 220 comprises a second input connected to the phase shifter 222 and an output for providing the plurality of second amplitude values 130. The phase shifter 222 is connected to the second ADC 220 and comprises an input for receiving the sampling signal 202 with the constant sampling frequency $f_c$. The phase shifter 222 may shift the sampling signal by 90° (+/−tolerance) so that the first amplitude values and the second amplitude values are sampled with a time difference $\Delta t$.

The constant sampling frequency $f_c$ may be chosen equal to a carrier frequency of the modulated carrier signal $RF_{IN}$ (+/−tolerance) so that the time difference $\Delta t$ is equal to a quarter (+/−tolerance) of the period of oscillation of the modulated carrier signal as also described above. In this connection, the sampler 110 may also be called I/Q-demodulator (inphase-quadrature phase-demodulator), since the amplitude values are sampled with 90° phase shift. Further, the plurality of first amplitude values 120 may also be called inphase-signal I and the plurality of second amplitude values 130 may also be called quadrature phase-signal Q.

The post-processing unit 260 comprises a first down-sampler 230, a second down-sampler 240 and a digital signal processor 250 (signal processing means). The first down-sampler 230 and the second down-sampler 240 are connected to the digital signal processor 250. The first ADC 210 provides the plurality of first amplitude values 120 to both down-samplers and the second ADC 220 provides the plurality of second amplitude values 130 also to both down-samplers.

The first down-sampler 230 may obtain and provide the first down-sampled digital signal I1 and the second down-sampled digital signal Q1 as described above. Further, the second down-sampler 240 may obtain and provide the third down-sampled digital signal I2 and the fourth down-sampled digital signal Q2 also, as described above. The digital signal processor 250 may obtain and provide a digital bitstream based on the first down-sampled digital signal and the second down-sampled digital signal both provided by the first down-sampler 230 or based on the third down-sampled digital signal I2 and the fourth down-sampled digital signal Q2 both provided by the second down-sampler 240.

FIG. 2 shows a sampling solution with two ADCs and a down-sampler. The constant sampling frequency $f_c$ of one ADC may, for example, be (13.56 MHz as, for example, used for RFID applications. Alternatively, the constant sampling frequency $f_c$ may be equal to other carrier frequencies used for RFID applications, mobile communication applications or, in general, wireless communication applications (for example, 900 MHz or 1800 MHz for mobile communication). Further, the down-sampling factor M (down-sampling frequency according to the predefined bit rate) may be adapted to the actual used bit rate (predefined bit rate).

Figure 3:
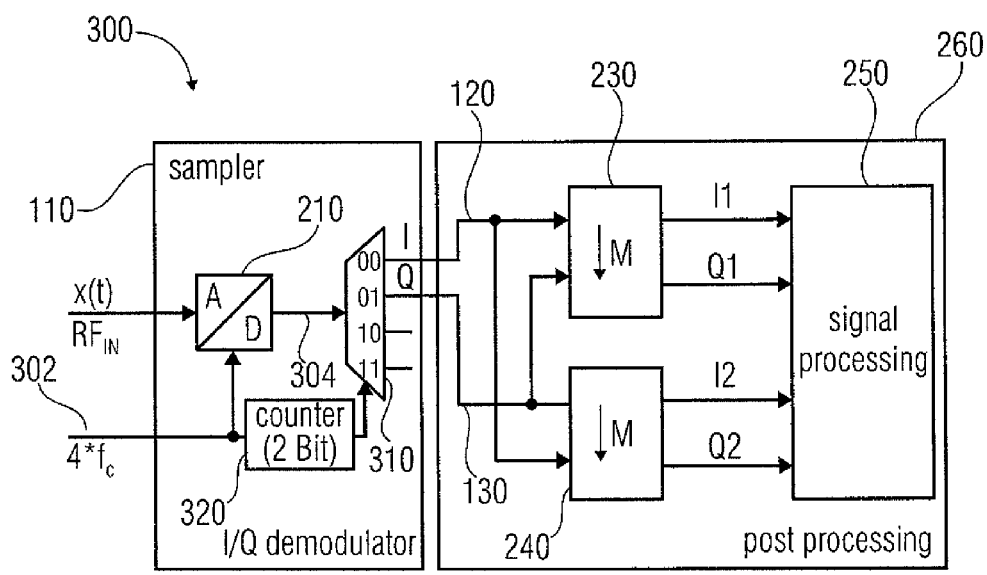
FIG. 3 is a block diagram of yet another embodiment of a demodulator.

FIG. 3 shows a block diagram of a demodulator 300 according to yet another embodiment of the invention. The demodulator 300 is similar to the demodulator shown in FIG. 2, but comprises an alternative implementation of the sampler 110. The sampler 110 comprises an ADC 210, a 1-to-4 multiplexer 310 and a 2-bit counter 320. The ADC 210 receives, at a first input, the modulated carrier signal $RF_{IN}$ (or x(t)) and at a second input a sampling signal 302 comprising a frequency equal to four times the constant sampling frequency $f_c$. Further, the ADC 210 provides a plurality of amplitude values 304 to the 1-to-4 multiplexer 310. The 2-bit counter 320 also receives the sampling signal 302 at an input and controls the 1-to-4 multiplexer 310 based on the sampling signal 302. The 1-to-4 multiplexer 310 provides, at a first output, the plurality of first amplitude values 120, which comprises every fourth amplitude value of the plurality of amplitude values 304 provided by the ADC 210. Further, the 1-to-4 multiplexer 310 provides, at a second output, the plurality of second amplitude values 130, which comprises every fourth plus one amplitude value of the plurality of amplitude values 304 provided by the ADC 210. In this way, a 90° phase shift (+/−tolerance) of the first amplitude values and the second amplitude values can be realized so that the same functionality may be realized, as provided by the sampler shown in FIG. 2.

The 1-to-4 multiplexer 310 is connected to both down-samples of the post-processing unit 260 and provides the plurality of first amplitude values 120 and the plurality of second amplitude values 130 to both down-samplers.

The post-processing unit 260 is equal to the post-processing unit of the demodulator shown in FIG. 2 and is, therefore, described above.

A 1-to-4 multiplexer is configured to switch one input to one of four outputs. In the example shown in FIG. 3, the 1-to-4 multiplexer 310 switches the input to the first output for each fourth amplitude value provided by the ADC and switches the input to the second output for each fourth plus one amplitude value provided by the ADC. Further, every fourth plus two amplitude value may be switched to a third output and every fourth plus three amplitude value may be switched to a fourth output, but the third and fourth output may not be used.

The demodulator 300 is a sampling solution with one ADC and down-sampler. The sampling frequency $f_c$ (constant sampling frequency) of the one ADC may be equal to four times 13.56=54.24 MHz or four times another frequency mentioned above. This may be the minimum sampling frequency to obtain the I (the plurality of first amplitude values) and Q (the plurality of second amplitude values) samples (90° sampling offset on the carrier). Alternatively, a higher frequency may also be used. Further, as mentioned above, the down-sampling factor M (the down-sampling frequency) may be adapted to the actual used bit rate (predefined bit rate).

A demodulator according to the described concept may, for example, be realized as an integrated (single-chip) solution or a multi-chip implementation (ADC and post processing ICs are separated).

Some embodiments according to the invention relate to a digital demodulation method for a demodulator for a contactless receiver.

The described concept presents a new demodulation concept, for example, for a contactless proximity reader (PCD). The data transmission from proximity integrated circuit card (PICC) to PCD is called uplink and the term downlink denotes the opposite communication direction. Existing readers may handle data rates up to 848 kbit/sec in both communication directions, which are defined in the standard 14443 Type A/B. Data rates above 848 kbit/sec are called "Very High Data Rates" (VHDR) and are proposed in several ISO working groups. For this reason, also new modulation methods and coding schemes are designed. The proposed concept introduces a new demodulation scheme, which can handle the modulation methods and coding schemes, which are intended for very high data rates. The proposed receiver architecture, for example, of a PCD is also very versatile concerning different communication standards (i.e., ISO 15693, ISO 14443, ISO 18000-3 Mode 1 and Mode 2).

Data rates above 848 kbit/sec for contactless applications are not standardized. Currently, the maximum data rates are limited to 848 kbit/sec for both communication directions. The data transmission from PICC to PCD is based on a load modulation of the carrier signal. This technique causes basically an amplitude modulation and, additionally, a phase modulation of the received carrier signal. For the demodulation of such a modulated signal, usually an I/Q demodulator is used, which can detect the amplitude and phase information.

Existing contactless receivers have almost an analog fronted with fixed adjusted filter circuits. Therefore, the receiver has no ability to deal with high data rates and/or different modulation methods. An analog I/Q demodulator is used, whereas the received signal is mixed with the carrier signal.

The invention establishes a demodulator concept of a contactless receiver, which can handle different modulation/coding methods for very high data rates. Already standardized modulation and coding methods can be processed by the proposed demodulator. Today, analog to digital converters are able to operate at high sampling rates. Therefore, the load-modulated carrier signal can be directly converted by an ADC without any analog down conversion.

The described concept may offer several advantages. For example, the hardware concept of the proposed demodulator (especially the analog front end) may be independent of the sub-carrier frequency and the modulation scheme, which offers a great advantage compared to other demodulator concepts. Further, the proposed solution may require no analog filter. In an (known) analog demodulator design, the filter must be adapted to the used sub-carrier frequency. Also, no digital filters may be necessary. A digital filter requires a higher sampling rate, i.e., needs a higher sample rate of the analog to digital converter. Additionally, no need of an analog mixer may be necessary. This task can be done by accordingly ADC sampling. Further, with the adaptive sampling scheme, the demodulator already outputs the baseband modulated sub-carrier.

The (constant) sampling frequency may be derived from the carrier (field) clock, which is used for the modulator of the PCD. Thus, the sampling clock is synchronous to the carrier clock. The proposed demodulation method is based on a non-coherent demodulation, i.e., the beginning of the carrier can vary and, consequently, the sampling points are not in phase to the carrier frequency. There exist several (known) demodulation schemes, which require a frequency and phase synchronization (coherent demodulation) between the sampling signal and the carrier/sub-carrier signal. But the proposed solution in this invention needs no adjustment of sampling points to the carrier.

Figure 4:
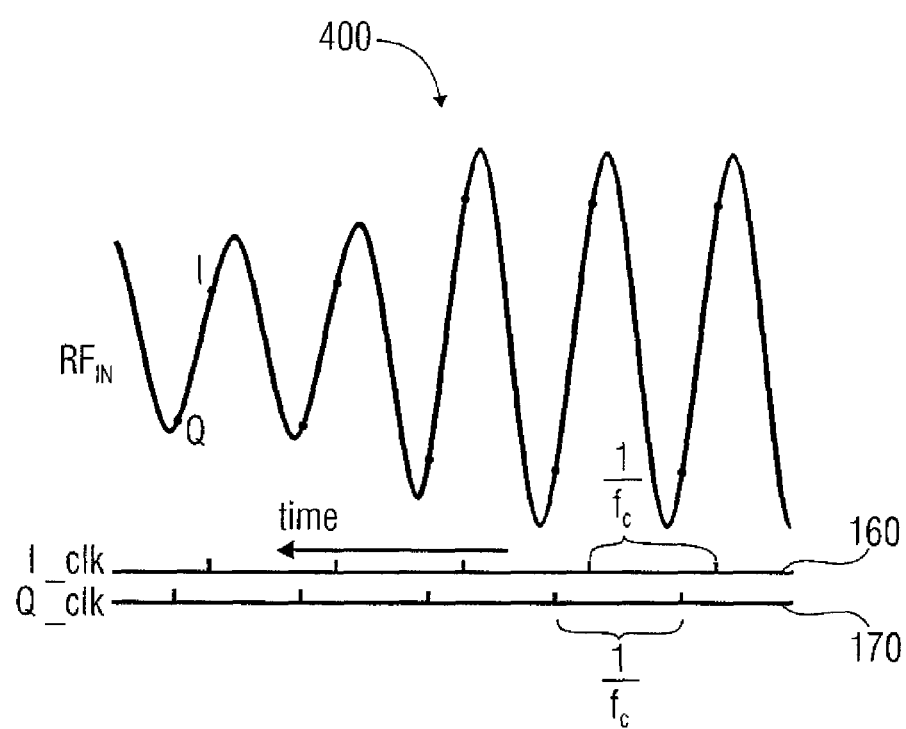
FIG. 4 is a schematic illustration of a modulated carrier signal with marked amplitude values.

FIG. 4 shows an example of the analog input signal $RF_{IN}$ of the PCD receiver and, in addition, the chronological sampling sequence to control the ADC. The sampling sequence (I_clk and Q_clk) results in two channels, which have a different signal quality, respectively.

Due to the 90° sampling offset upon the carrier signal (13.56 MHz), the method can guarantee that at least one of the two channels always has an adequate signal quality.

Figure 5:
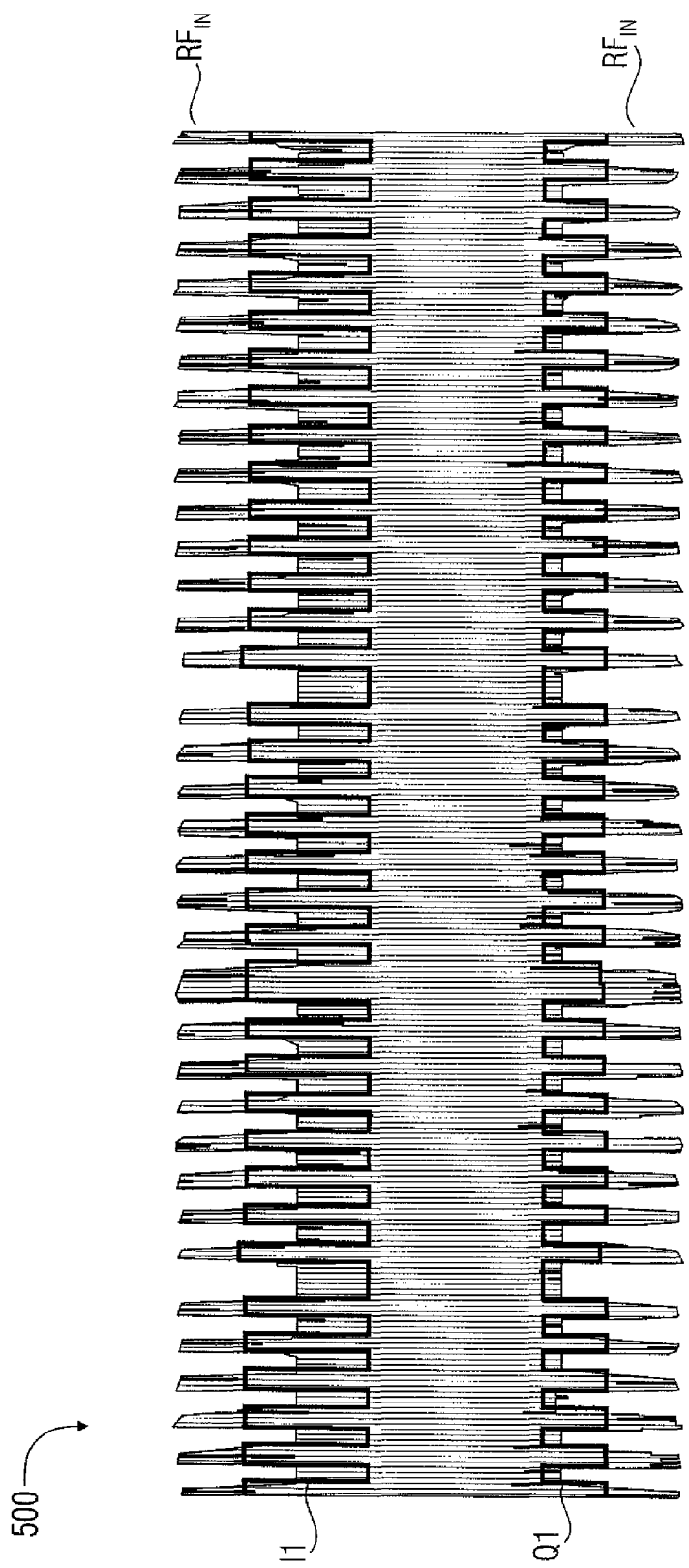
FIG. 5 is a schematic illustration of a modulated carrier signal and a corresponding first and second down-sampled digital signals.

The signal strength of each channel depends on the phase offset of the sampling points (I_clk and Q_clk) and the input signal $RF_{IN}$. This offset between the sampling points and the carrier signal is unknown in this example. Consequently, this fact must be considered by the further post processing unit. There exist several methods to choose the right channel for further data processing. FIG. 5 shows two digitized sub-carrier sequences after post processing (decimation, etc.). As mentioned before, due to the adaptive adjustment of the sampling frequency, analog and digital filters may be no longer required.

One aspect of the invention is, for example, the special ADC I/Q sampling method on the carrier signal. Conventional I/Q demodulators (analog or digital) generate an output signal with a double carrier frequency (e.g., 27.12 MHz for $f_c$=13.56 MHz). This results by the mixing process of the carrier signal with the sinusoidal/cosine signal. This frequency part must be eliminated by an analog or digital low-pass filter. In this invention, no analog mixer is used. Instead, this mixing process is done by ADC sampling, which is based on the 90° sampling offset referred to the carrier signal. The maximum frequency of the ADC output signal equals to the half frequency of the sampling signal, i.e., the ADC sampling process limits the frequency of the output signal, like a low-pass filter. Consequently, no doubled frequency part appears and, thus, no analog or digital lowpass filter may be necessary. The sampling of the I/Q points is done with the ADC, i.e., the I/Q demodulation process is performed by the ADC. The I/Q sampling method assures that at least one of the two channels has an adequate signal quality for the post processing.

In more detail, FIG. 4 shows an example 400 of an analog carrier signal $RF_{IN}$ with I/Q sampling sequence/points on carrier and FIG. 5 shows an example 500 of an analog carrier signal $RF_{IN}$ with two sub-carrier channels.

FIG. 4 indicates the sampling times 160 of the plurality of first amplitude values 120, which may also be called inphase clock I_clk and the sampling times 170 of the plurality of second amplitude values 130, which may also be called quadrature phase clock Q_clk. Further, a schematic illustration of a modulated carrier signal with marked sampling points is illustrated.

FIG. 5 shows an example 500 for a pair of down-sampled digital signals as, for example, a first down-sampled digital signal I1 and a second down-sampled digital signal Q1 provided by the first down-sampler 230 of FIG. 2 or FIG. 3. The upper black line may indicate a first down-sampled digital signal I1 and the lower black line may indicate a second down-sampled digital signal Q1. Further, the grey background indicates the modulated carrier signal $RF_{IN}$ from which the down-sampled signals are obtained.

Some embodiments according to the invention relate to a transceiver comprising a demodulator according to the concept described above and an oscillator unit. The oscillator unit or carrier clock may provide an oscillator signal comprising a carrier frequency. The transceiver may be able to transmit a signal with the carrier frequency and to receive the modulated carrier signal. The constant sampling frequency may be equal to the carrier frequency of the oscillator signal with a tolerance of +/−1% of the carrier frequency.

The transceiver may, for example, be a transceiver of a mobile phone, a contactless proximity reader or another device for wireless communication applications.

Some embodiments according to the invention relate to a demodulator comprising a sampler configured to sample a plurality of first amplitude values of a modulated carrier signal using a constant sampling frequency and a plurality of second amplitude values of the modulated carrier signal at different times using the same constant sampling frequency. The constant sampling frequency is equal to a carrier frequency of the modulated carrier signal with a tolerance of +/−1% of the carrier frequency.

Additionally, a time a first amplitude value of a plurality of first amplitude values is determined and a time a temporal directly following second amplitude value of the plurality of second amplitude values may be determined comprising a time difference. The time difference may be equal to a quarter of the period of oscillation of the modulated carrier signal with a tolerance of +/−1% of the period of oscillation.

Additionally, further aspects (e.g., sampler implementations, down sampler or digital signal processor) of the concept described above may be implemented.

Optionally, at a time a first amplitude value of the plurality of first amplitude values is determined and a time a temporal directly following second amplitude values of the plurality of second amplitude values is determined may comprise a time difference so that for each pair of first and second amplitude values, at least an absolute value of the first amplitude value or an absolute value of the temporal directly following second amplitude value is equal to or larger than 50% of a maximal absolute value of the amplitude of the modulated carrier signal between the first amplitude value and a temporal directly following first amplitude value or between the first amplitude value and a temporal directly preceding first amplitude value.

In this way, the modulated carrier signal is under-sampled, but the signal modulated onto the carrier signal may comprise a lower frequency than the carrier signal itself and may, therefore, be resolved by the under-sampling. In this way, analog mixers and additional analog and/or digital filters as used by known demodulators may not be necessary.

In some embodiments according to the invention, a demodulator comprises a means for sampling a plurality of first amplitude values of a modulated carrier signal using a constant sampling frequency and a plurality of second amplitude values of the modulated carrier signal at different times using the same constant sampling frequency. A time a first amplitude value of the plurality of first amplitude values is determined and a time a temporal directly following second amplitude value of the plurality of second amplitude values is determined comprises the time difference so that for each pair of first and second amplitude values, at least an absolute value of the first amplitude value or an absolute value of the temporal directly following second amplitude value is equal to or larger than 50% of a maximal absolute value of an amplitude of the modulated carrier signal between the first amplitude value and a temporal directly following first amplitude value or between the first amplitude value and a temporal directly preceding first amplitude value.

Figure 6:
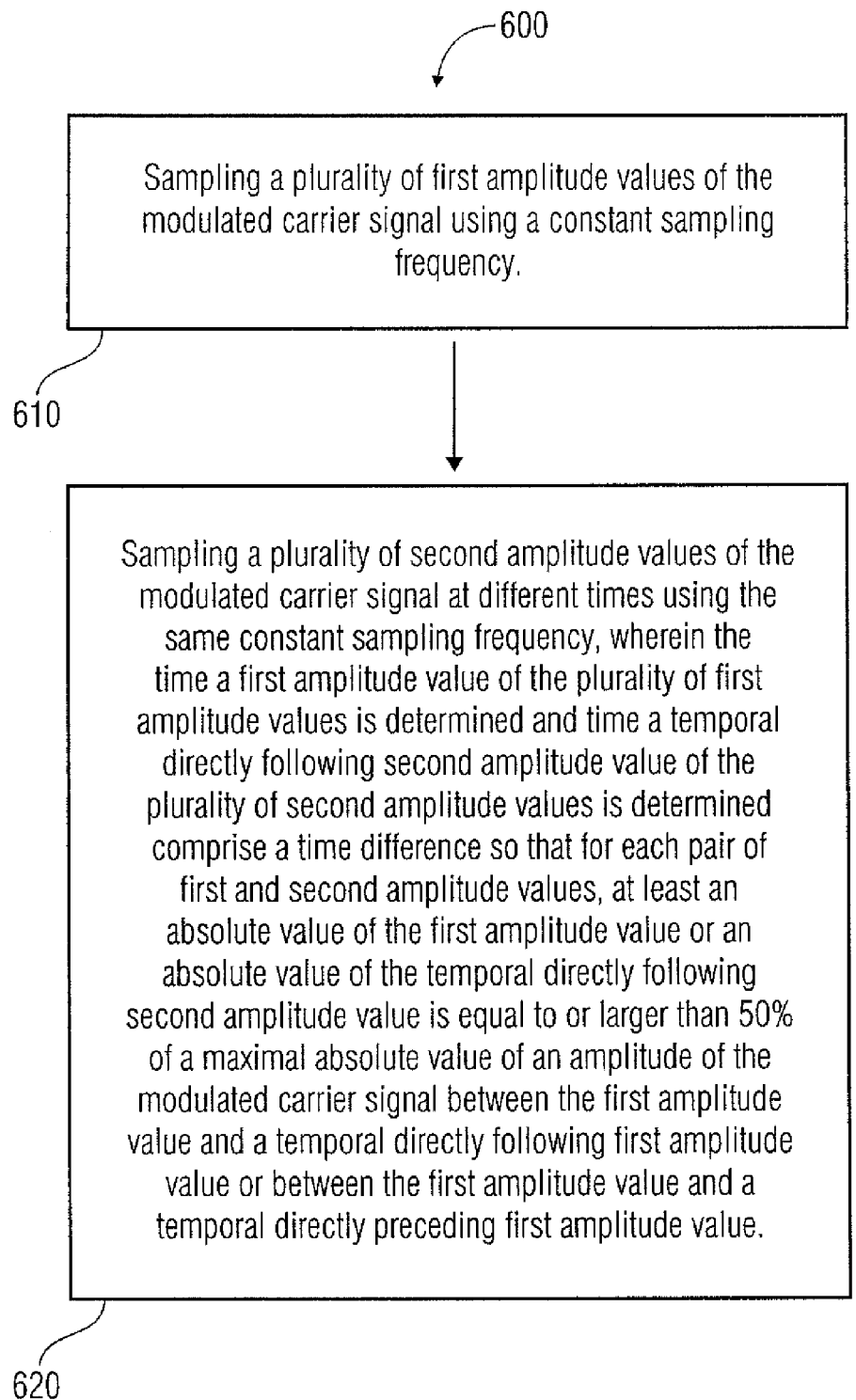
FIG. 6 is a flow chart of an embodiment of a method for demodulating a modulated carrier signal.

FIG. 6 shows a flow chart of a method 600 for demodulating a modulated carrier signal according to an embodiment of the invention. The method 600 comprises sampling a plurality of first amplitude values of the modulated carrier signal using a constant sampling frequency (Step 610). Further, the method 600 comprises sampling a plurality of second amplitude values of the modulated carrier signal at different times using the same constant sampling frequency (Step 620). The amplitude values are sampled so that a time a first amplitude value of the plurality of first amplitude values is determined and a time a temporal directly following second amplitude value of the plurality of second amplitude values is determined comprises a time difference so that for each pair of first and second amplitude values, at least an absolute value of the first amplitude value or an absolute value of the temporal directly following second amplitude value is equal to or larger than 50% of a maximal absolute value of an amplitude of the modulated carrier signal between the first amplitude value and a temporal directly following first amplitude value or between the first amplitude value and a temporal directly preceding first amplitude value.

Additionally, the method may comprise a down-sampling to obtain and provide a first down-sampled digital signal with a predefined bit rate based on the plurality of first amplitude values by selecting first amplitude values from the plurality of first amplitude values with a down-sampling frequency according to the predefined bit rate. Further, the method may comprise a down-sampling to obtain and provide a second down-sampled digital signal with the predefined bit rate from the plurality of second amplitude values by selecting second amplitude values of the plurality of second amplitude values with the same down-sampling frequency. Additionally, the method may comprise a down-sampling to obtain and provide a third down-sampled signal with the predefined bit rate based on the plurality of first amplitude values by selecting first amplitude values different from the first amplitude values selected by the first down-sampling with the same down-sampling frequency and a down-sampling to obtain and provide a fourth down-sampled signal with the predefined bit rate based on the plurality of second amplitude values by selecting second amplitude values different from the second amplitude value selected by the first down-sampling of the second amplitude values with the same down-sampling frequency.

Figure 7:
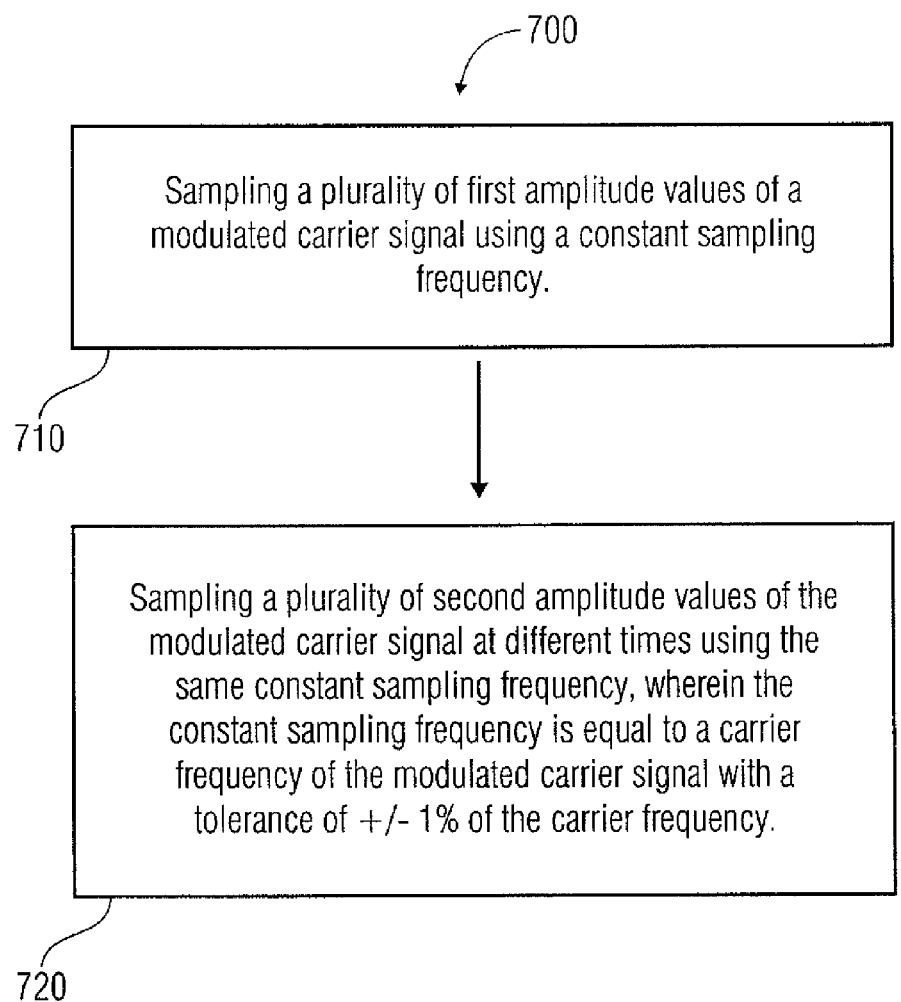
FIG. 7 is a flow chart of another embodiment of a method for demodulating a modulated carrier signal.

FIG. 7 shows a flow chart of a method 700 for demodulating a modulated carrier signal according to another embodiment of the invention. The method 700 comprises sampling a plurality of first amplitude values of a modulated carrier signal using a constant sampling frequency (Step 710) and sampling a plurality of second amplitude values of the modulated carrier signal at different times using the same constant sampling frequency (Step 720). The constant sampling frequency is equal to a carrier frequency of the modulated carrier signal with a tolerance of +/−1% of the carrier frequency.

Although some aspects of the described concept have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Although some claims only relate to one other claim, also a combination with further claims may be possible.

What is claimed is:

1. A demodulator comprising:
   a sampler configured to sample a plurality of first amplitude values of a modulated carrier signal using a constant sampling frequency and a plurality of second amplitude values of the modulated carrier signal at different times using the same constant sampling frequency; and
   wherein a time a first amplitude value of the plurality of first amplitude values is determined and a time a temporal directly following a second amplitude value of the plurality of second amplitude values is determined comprises a time difference so that for each pair of first and second amplitude values at least an absolute value of the first amplitude value or an absolute value of the temporal directly following the second amplitude value is equal to or larger than 50% of a maximal absolute value of an amplitude of the modulated carrier signal between the first amplitude value and a temporal directly following the first amplitude value or between the first amplitude value and a temporal directly preceding the first amplitude value.

2. A demodulator according to claim 1, wherein the constant sampling frequency is equal to a carrier frequency of the modulated carrier signal with a tolerance of +/−1% of the carrier frequency.

3. A demodulator according to claim 1, wherein the time difference is equal to a quarter of the period of oscillation of the modulated carrier signal with a tolerance of +/−1% of the period of oscillation.

4. A demodulator according to claim 1, wherein the sampler comprises a first and a second analog-digital-converter, wherein the first analog-digital-converter is triggered by a sampling signal comprising the constant sampling frequency and the second analog-digital-converter is triggered by the sampling signal delayed by the time difference, wherein the first analog-digital-converter is configured to sample and provide the plurality of first amplitude values and the second analog-digital-converter is configured to sample and provide the plurality of second amplitude values.

5. A demodulator according to claim 1, wherein the sampler comprises an analog-digital-converter and a 1-to-4 multiplexer, wherein the analog-digital-converter is triggered by a sampling signal comprising a frequency equal to four times the constant sampling frequency to obtain and provide a plurality of amplitude values of the modulated carrier signal to the 1-to-4 multiplexer, wherein the 1-to-4 multiplexer is configured to select every fourth amplitude value of the plurality of amplitude values to obtain and provide the plurality of first amplitude values and to select every fourth plus one amplitude value of the plurality of amplitude values to obtain and provide the plurality of second amplitude values.

6. A demodulator according to claim 5, wherein the sampler comprises a 2-bit counter triggered by the sampling signal and configured to control the 1-to-4 multiplexer.

7. A demodulator according to claim 1, comprising a down-sampler configured to obtain and provide a first down-sampled digital signal with a predefined bit rate by selecting first amplitude values from the plurality of first amplitude values with a down-sampling frequency according to the predefined bit rate and configured to obtain and provide a second down-sampled digital signal with the predefined bit rate by selecting second amplitude values of the plurality of second amplitude values with the same down-sampling frequency.

8. A demodulator according to claim 7, wherein the predefined bit rate is equal to a bit rate of a modulation of the modulated carrier signal or an integer multiple of the modulation of the modulated carrier signal.

9. A demodulator according to claim 7, comprising a second down-sampler configured to obtain and provide a third down-sampled digital signal with the predefined bit rate by selecting first amplitude values different from the first amplitude value selected by the first down-sampler with the same down-sampling frequency and configured to obtain and provide a fourth down-sampled digital signal with the predefined bit rate by selecting second amplitude values different from the second amplitude value selected by the first down-sampler with the same down-sampling frequency.

10. A demodulator according to claim 9, wherein the first and the second down-samplers are configured to select amplitude values so that a time a first amplitude value is selected by the first down-sampler and a time a first amplitude value is selected by the second down-sampler comprises a down-sampling time difference and so that a time a second amplitude value is selected by the first down-sampler and a time a second amplitude value is selected by the second down-sampler comprises the same down-sampling time difference, wherein the down-sampling time difference depends on the predefined bit rate.

11. A demodulator according to claim 9, comprising a digital signal processor configured to obtain and provide a digital bitstream based on the plurality of first amplitude values and the plurality of second amplitude values based on the first down-sampled digital signal and the second down-sampled digital signal of the first down-sampler or based on the third down-sampled digital signal and the fourth down-sampled digital signal of the second down-sampler.

12. A demodulator according to claim 1, comprising a first and a second analog-digital-converter, a phase shifter, a first and a second down-sampler and a digital signal processor, wherein the first analog-digital-converter is connected to the first down-sampler and the second down-sampler, wherein the second analog-digital-converter is connected to the first down-sampler and the second down-sampler, wherein the first down-sampler and the second down-sampler are connected to the digital signal processor, wherein the phase shifter is connected to the second analog-digital-converter, wherein the modulated carrier signal is provided to the first and the second analog-digital-converter, wherein a sampling signal comprising the constant sampling frequency is provided to the first analog-digital-converter and the phase shifter, wherein the first analog-digital-converter is configured to provide the plurality of first amplitude values to the first and the second down converter, wherein the second analog-digital-converter is configured to provide the plurality of second amplitude values to the first and the second down-sampler, wherein the first down-sampler is configured to provide a first down-sampled digital signal and a second down-sampled digital signal to the digital signal processor, and wherein the second down-sampler is configured to provide a third down-sampled digital signal and a fourth down-sampled digital signal to the digital signal processor.

13. A demodulator according to claim 1, comprising an analog-digital-converter, a 1-to-4 multiplexer, a 2-bit counter, a first down converter, a second down converter and a digital signal processor, wherein the analog-digital-converter and the 2-bit counter are connected to the 1-to-4 multiplexer, wherein the 1-to-4 multiplexer is connected to the first and the second down-sampler, wherein the first and the second down-sampler are connected to the digital signal processor, wherein the modulated carrier signal is provided to the analog-digital-converter, wherein a sampling signal comprising a frequency of four times the constant sampling frequency is provided to the first analog-digital-converter and the 2-bit counter, wherein the analog-digital-converter is configured to provide a plurality of amplitude values to the 1-to-4 multiplexer, wherein the 1-to-4 multiplexer is configured to provide the plurality of first amplitude values to the first and the second down-sampler and provide the plurality of second amplitude values to the first and the second down-sampler, wherein the first down-sampler is configured to provide a first down-sampled digital signal and a second down-sampled digital signal to the digital signal processor and wherein the second down-sampler is configured to provide a third down-sampled digital signal and a fourth down-sampled digital signal to the digital signal processor.

14. A demodulator according to claim 1, wherein the modulated carrier signal is a load modulated carrier signal.

15. A demodulator comprising:
a means for sampling a modulated carrier signal configured to sample a plurality of first amplitude values of a modulated carrier signal using a constant sampling frequency and a plurality of second amplitude values of the modulated carrier signal at different times using the same constant sampling frequency,
wherein the time a first amplitude value of the plurality of first amplitude values is determined and the time a temporal directly following a second amplitude value of the plurality of second amplitude values is determined comprises a time difference so that for each pair of first and second amplitude values, at least an absolute value of the first amplitude value or an absolute value of the temporal directly following the second amplitude value is equal to or larger than 50% of a maximal absolute value of an amplitude of the modulated carrier signal between the first amplitude value and a temporal directly following the first amplitude value or between the first amplitude value and a temporal directly preceding the first amplitude value.

16. A transceiver comprising:
a demodulator comprising a sampler configured to sample a plurality of first amplitude values of a modulated carrier signal using a constant sampling frequency and a plurality of second amplitude values of the modulated carrier signal at different times using the same constant sampling frequency, wherein a time a first amplitude value of the plurality of first amplitude values is determined and a time a temporal directly following a second amplitude value of the plurality of second amplitude values is determined comprises a time difference so that for each pair of first and second amplitude values at least an absolute value of the first amplitude value or an absolute value of the temporal directly following the second amplitude value is equal to or larger than 50% of a maximal absolute value of an amplitude of the modulated carrier signal between the first amplitude value and a temporal directly following the first amplitude value or between the first amplitude value and a temporal directly preceding the first amplitude value; and
an oscillator unit configured to provide an oscillator signal comprising a carrier frequency, wherein the transceiver is configured to transmit a signal with the carrier frequency and to receive the modulated carrier signal, wherein the constant sampling frequency is equal to the carrier frequency of the oscillator signal with a tolerance of +/−1% of the carrier frequency.

17. A transceiver according to claim 16, wherein the transceiver is a part of a proximity-coupling device or a contactless proximity reader.

18. A method for demodulating a modulated carrier signal, comprising:

sampling a plurality of first amplitude values of the modulated carrier signal using a constant sampling frequency; and sampling a plurality of second amplitude values of the modulated carrier signal at different times using the same constant sampling frequency, wherein a time a first amplitude value of the plurality of first amplitude values is determined and a time a temporal directly following a second amplitude value of the plurality of second amplitude values is determined comprises a time difference so that for each pair of first and second amplitude values, at least an absolute value of the first amplitude value or an absolute value of the temporal directly following the second amplitude value is equal to or larger than 50% of a maximal absolute value of an amplitude of the modulated carrier signal between the first amplitude value and a temporal directly following the first amplitude value or between the first amplitude value and a temporal directly preceding the first amplitude value.

19. A method according to claim 17, further comprising:

selecting first amplitude values from the plurality of first amplitude values with a down-sampling frequency according to a predefined bit rate to obtain and provide a first down-sampled digital signal with the predefined bit rate;

selecting second amplitude values from the plurality of second amplitude values with the down-sampling frequency according to the predefined bit rate to obtain and provide a second down-sampled digital signal with the predefined bit rate;

selecting first amplitude values different from the first amplitude values selected for the first down-sampled digital signal with the same down-sampling frequency to obtain and provide a third down-sampled digital signal with the predefined bit rate; and selecting second amplitude values different from the second amplitude values selected for the second down-sampled digital signal with the same down-sampling frequency to obtain and provide a fourth down-sampled digital signal with the predefined bit rate.

* * * * *